UNITED STATES PATENT OFFICE.

E. C. HASERICK, OF LAKE VILLAGE, NEW HAMPSHIRE.

IMPROVED MODE OF MELTING AND AGGREGATING IRON CHIPS, TURNINGS, &c.

Specification forming part of Letters Patent No. 53,142, dated March 13, 1866.

*To all whom it may concern:*

Be it known that I, E. C. HASERICK, of Lake Village, in the county of Belknap and State of New Hampshire, have invented a new and useful Improvement in Melting Iron; and I do hereby declare that the following is a full, clear, and exact description thereof, which will enable others skilled in the art to fully understand and make use of the same.

This invention consists in a new and useful process of treating and melting iron chips—such, for instance, as the turnings which accumulate under lathes in machine-shops, and which, unless melted together and brought into a common mass, are treated as waste and are considered useless. Attempts have been made to reduce them into a common mass by placing them within pots or castings before they are put in the blast, so as to keep the oxygen from burning them and blowing them out of the cupola; but such attempts have not been economical and profitable.

My improved method and process is as follows: I take fine chips, turnings, and shavings of iron, which, if placed directly in a furnace, would be liable to be burned in contact with the oxygen of the blast and to be blown out by the blast, and mix them with common clay, to which may be added a little sulphuric acid—enough to create a little alum. The whole mass is then treated with water and mixed to about the consistency of common mortar. By this means the fine particles of iron are more or less concealed in and protected by the clay, and are brought to a condition somewhat resembling iron in the ore, the iron being protected from the access of oxygen, and so the burning of the iron is prevented.

I have found that iron turnings brought into such a pasty condition are easily melted without danger of burning them or having them blown away in the blast.

In carrying out my invention I take about one thousand pounds of iron chips, turnings, and shavings from repair and machine shops. Then I mix common clay with water to about the consistency of milk and add the iron, mixing and stirring the mass until the iron is well mixed, enough of the mixed clay and water being added to bring the whole to a pasty condition, like mortar. It is then ready to be put into the fire, when the iron will be quickly melted without injury to its quality and without much loss of its quantity.

Any sort of moist earth can be used instead of clay, and I have used earth and ashes mixed with water with success.

One of my experiments with one thousand pounds of chips resulted as follows: pure iron for castings, eight hundred and thirty pounds; cinders, one hundred and fifteen pounds: loss, fifty-five pounds; total, one thousand pounds.

The chips may be mixed immediately before using them or days before.

When the paste or mixture is rather dry more clay or earth should be added to protect the iron, and the addition of a little sulphuric acid will be advantageous.

I claim as new and desire to secure by Letters Patent—

Melting iron chips, shavings, or turnings, and other fine particles of iron loosely put in a furnace, and preventing them from being burned and blown away by mixing them with earth or clay and water, substantially as described.

The above specification of my invention signed by me this 24th day of November, 1865.

E. C. HASERICK.

Witnesses:
 NAPOLEON B. GALE,
 JOHN H. TILTON.